J. I. ARBOGAST.
MACHINE FOR MAKING WIRE GLASS.
APPLICATION FILED JUNE 28, 1909.
941,842.
Patented Nov. 30, 1909.
2 SHEETS—SHEET 1.
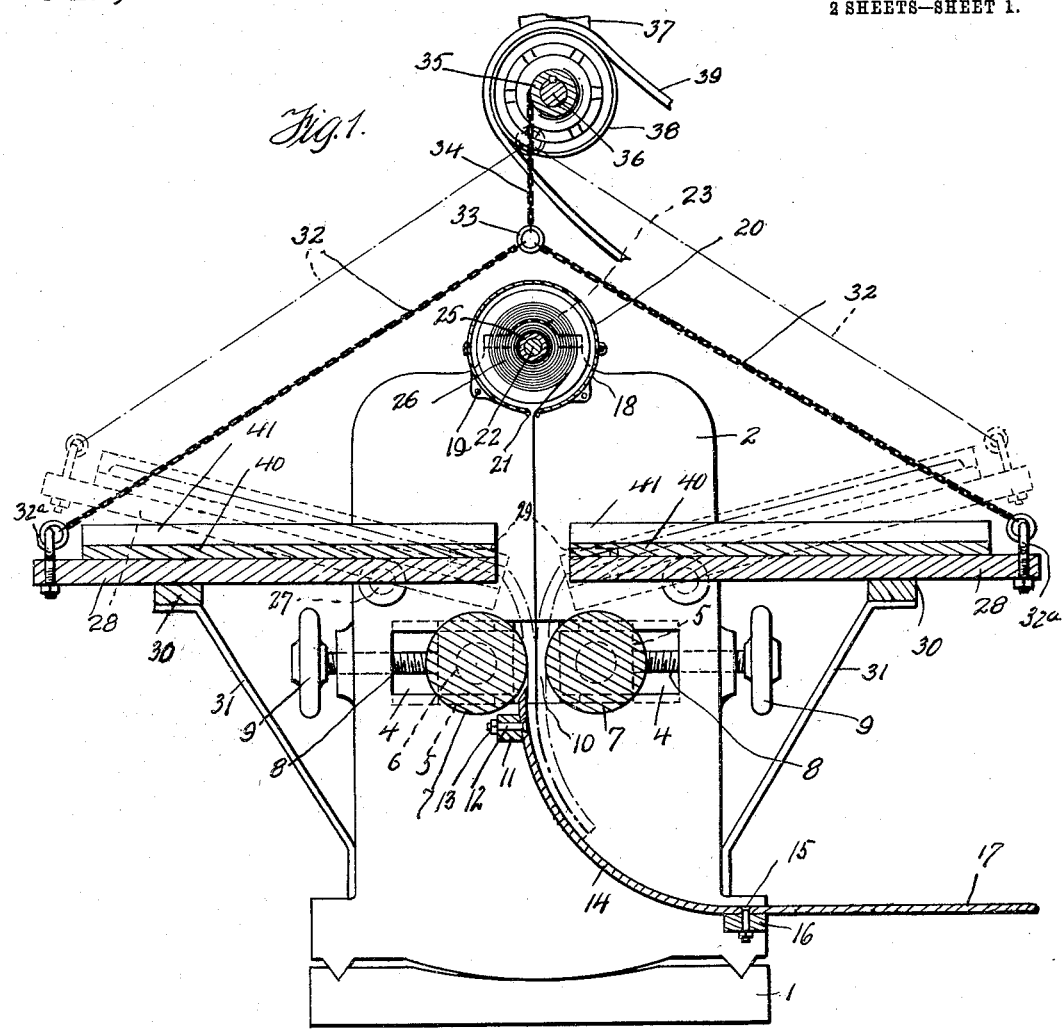
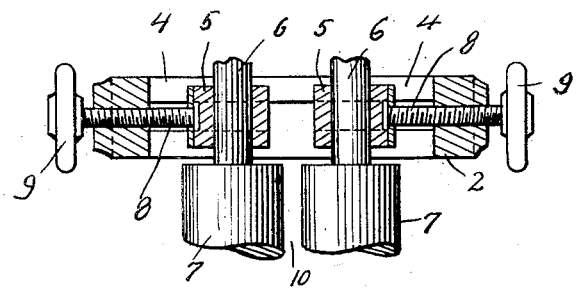
Witnesses
Samuell Payne
N. H. Butler
Inventor
J. I. Arbogast.
By H. C. Everh...
Attorneys.

J. I. ARBOGAST.
MACHINE FOR MAKING WIRE GLASS.
APPLICATION FILED JUNE 28, 1909.
941,842.
Patented Nov. 30, 1909.
2 SHEETS—SHEET 2.
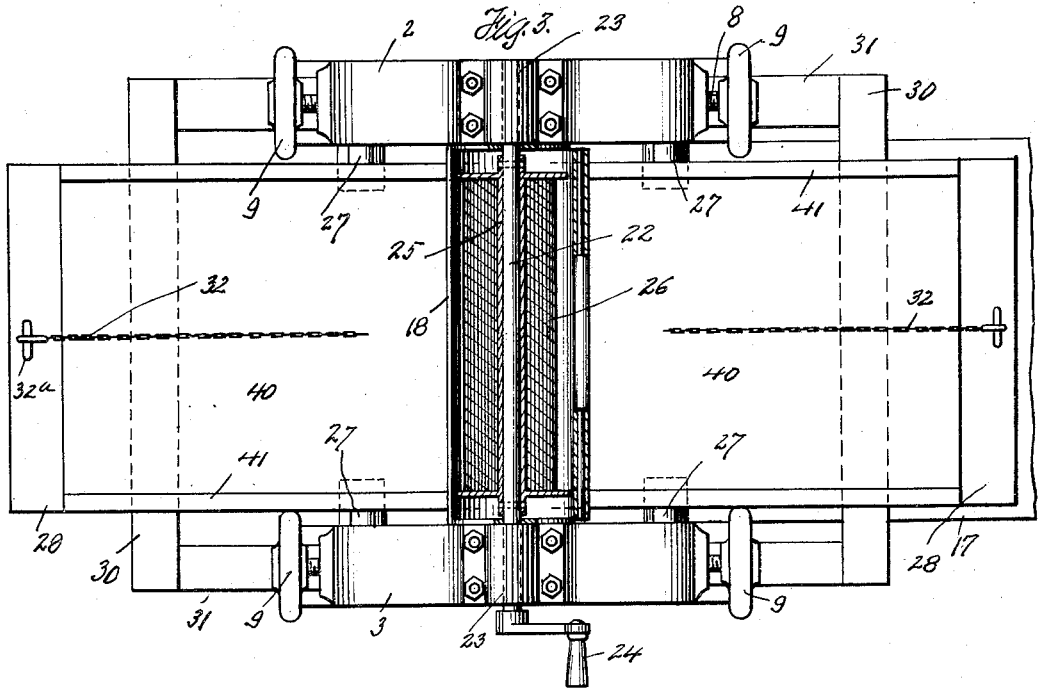
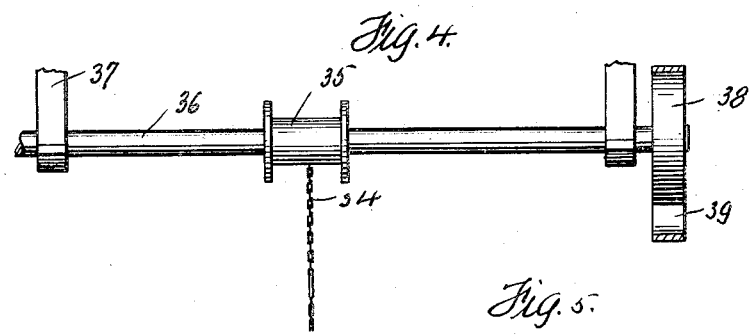
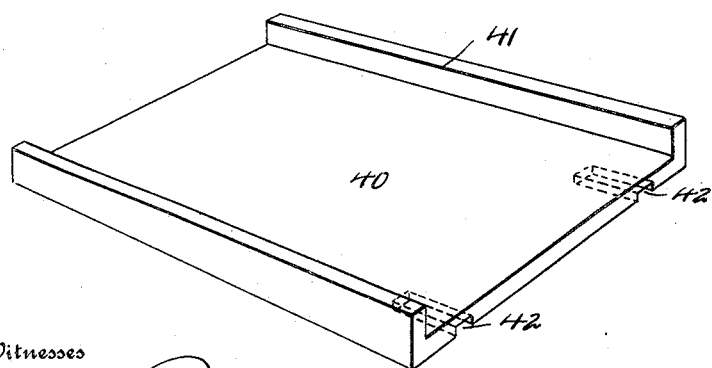
Witnesses
Samuel Payne
K. H. Butler
Inventor
J. I. Arbogast.
By H. C. Evert & Co.
Attorneys

UNITED STATES PATENT OFFICE.

JOHN I. ARBOGAST, OF PITTSBURG, PENNSYLVANIA, ASSIGNOR OF ONE-HALF TO HENRY L. COLLINS, OF PITTSBURG, PENNSYLVANIA.

MACHINE FOR MAKING WIRE-GLASS.

941,842.  Specification of Letters Patent.  Patented Nov. 30, 1909.

Application filed June 28, 1909. Serial No. 504,711.

*To all whom it may concern:*

Be it known that I, JOHN I. ARBOGAST, a citizen of the United States of America, residing at Pittsburg, in the county of Allegheny and State of Pennsylvania, have invented certain new and useful Improvements in Machines for Making Wire-Glass, of which the following is a specification, reference being had therein to the accompanying drawing.

This invention relates to a machine for making wire-glass, and the object of my invention is to provide wire-glass of a superior quality.

Another object of my invention is to provide a simple machine wherein positive and reliable means are employed for controlling the wire and glass to be welded or joined together.

A further object of this invention is to reduce oxidation of the wire to a minimum and maintain the wire in proper shape and position to be incased or "sandwiched" by two sheets or bodies of glass.

The invention in its broadest aspect involves positive means for preparing two sheets or bodies of glass whereby said sheets or bodies when brought together will be in perfect condition for welding or joining purposes. To this end, I have devised a machine embodying a plurality of structural elements which when combined, provide a durable, easily adjusted and quickly operated machine for producing wire-glass that can be used either in the rough or polished.

The principal elements of the invention—namely, housings and rolls, a wire feeding drum and tiltable stands or platforms together with the mechanism for operating the same—will be hereinafter separably and specifically described in detail, together with the novel arrangement and objects accomplished from such a combination of elements.

The preferred embodiments of the invention are illustrated in the accompanying drawings, but it must be understood that the same are susceptible to various changes without departing from the scope of the invention.

In the drawings:—Figure 1 is a vertical, longitudinal sectional view of the machine, showing in dotted lines the tiltable stands or platforms at an inclination, Fig. 2 is a horizontal sectional view of one of the housings, illustrating the adjustment of the roll bearings, Fig. 3 is a plan of the machine partly broken away and partly in section, Fig. 4 is a front elevation of a portion of the tiltable mechanism of the stands, and, Fig. 5 is a perspective view of a mold or slab forming part of each tiltable stand.

My improved machine is constructed of strong and durable metal and consists of comparatively few parts easily assembled to provide a rigid equi-balanced machine for producing a quality of wire-glass that is superior in many respects to the wire-glass at present used, besides being manufactured at a less cost and in a more expeditious manner.

One of the novel features of the machine is the tiltable stands or platforms which are arranged and provided with molds or slabs to receive batches of molten glass, and the juxtaposition of these platforms relative to the rolls permitting of said platforms being tilted to discharge the molten glass between said rolls, without choking or retardation of the rolls or the glass passing between the rolls.

As the consistency and temperature of molten glass is an important matter in the production of wire-glass, it is essential that the molten glass be handled as expeditiously as possible, and at the same time allow the molten glass to congeal to that point or degree best suited for welding or joining purposes between the rolls of the machine. It is this last mentioned feature of my machine, namely, the tiltable stands or platforms that perform the necessary function of preparing and properly placing the two bodies of glass to be welded or joined together.

Another feature of my invention is the wire feeding drum, which is located in proximity to the rolls and in position to properly feed a wire gauze or strips of wire between the rolls to be incased and sandwiched by the bodies or sheets of glass fed to the rolls by the tiltable stands or platforms.

Considering now the features of my invention, reference will be had to the housings and rolls.

*Housings and rolls.*—With reference to the drawings, 1 denotes a base plate or foundation provided with vertical parallel movable housings 2 and 3 having oppositely disposed openings 4 for bearing blocks 5, revolubly supporting the spindles or necks 6 of two transverse rolls 7. Movably connected to the bearing blocks 5 in each housing are screws 8, said screws being threaded in the housings with the outer ends thereof provided with hand wheels 9, whereby said screws can be rotated to move the rolls 7 and increase or decrease the width of the pass 10 between said rolls. The position of these rolls regulates the thickness of the wire glass produced by my machine, and said rolls can be driven by a motor or suitable source of power directly or indirectly coupled to the spindles or necks 6 of said rolls. The housings 2 and 3 adjacent to one of said rolls are connected by a transverse bar 11, and detachably connected to said bar by bolts 12 and nuts 13 is a chute, comprising a curved plate 4 having the lower end thereof secured, as at 15, to another transverse bar 16 connecting the housings 2 and 3. The curved plate is extended beyond the bar 16 in a horizontal plane to provide the support 17 for the wire glass produced by my machine. The upper edge of the curved plate 14 is in proximity to one of the rolls and alined with the periphery of said roll, said curved chute forming a continuation of the pass 10 for guiding wire glass on to the support 17.

*Wire-feeding drum.*—The reference numeral 18 denotes a cylindrical drum secured as at 19, to the confronting sides of the housings 2 and 3 at the upper ends thereof. This drum is provided with a hinged or movable upper section 20, while the lower section thereof is provided with a longitudinal slot 21 in vertical alinement with the pass 10 of the rolls 7. Longitudinally and centrally of the drum 18 is a shaft 22 having the ends thereof revolubly mounted in bearings 23 secured to the housings 2 and 3. One end of the shaft 22 is provided with a crank 24, whereby said shaft can be manually rotated, but I reserve the right to use mechanical means for this purpose. Upon the shaft 22 within the drum 18 is mounted a spool 25, and wound upon this spool is wire gauze 26 having one end thereof attached to the spool, while the opposite end of the wire gauze extends through the slot 21 and is adapted to pass downwardly between the rolls 7. Through the medium of the drum 18 and spool 25 the wire gauze is maintained in shape, and the passage of the wire gauze between the rolls 7 is easily controlled, besides being fully protected from oxidation and corrosion when the machine is inactive.

*The tiltable stands or platforms together with mechanism for operating the same.*— The reference numeral 27 denotes the trunnions of oppositely disposed stands or platforms 28, said trunnions being located contiguous to the inner ends of said stands or platforms and extending into the housings, 2 and 3. The stands or platforms comprise flat plates having the inner edges thereof above the roll 7, said inner edges being provided with stop lugs or ribs 29, for a purpose that will hereinafter appear. The stands or platforms are normally supported in a horizontal position by transverse bars 30 supported by angularly disposed brackets 31 carried by the edges of the housings 2 and 3, said bars engaging the stands or platforms adjacent to the outer ends thereof.

32$^a$ denotes eye-bolts mounted centrally of the outer ends of the stands or platforms and connected to these eye-bolts are chains or cables 32 having the upper ends thereof connected by a ring or link 33, carried by a chain 34 adapted to wind upon a spool 35. The spool 35 is keyed or otherwise secured to a transverse shaft 36 journaled in hangers 37 suspended to secure to a suitable support (not shown) located above the housings 2 and 3. Fixed to one end of the shaft 36 is a pulley or belt wheel 38 for a belt 39 adapted to be driven from a suitable source of power for winding the chain or cable 34 upon the spool 35. When the source of power is shut off the stands or platforms 28 are adapted to assume their normal horizontal position by gravity.

Arranged upon each stand or platform 28 is a mold or slab 40 having the sides thereof provided with vertical longitudinal flanges or walls 41. The bottom of each mold or slab at one end thereof is recessed, as at 42 to receive the stop lugs or ribs 29 of the stands or platforms 28, these lugs or ribs preventing the molds or slabs from sliding from the stands or platforms, when said stands or platforms are tilted.

The operation of the machine is as follows:—The wire gauze 26 is unwound from the spool 35 until the lower end thereof hangs in the pass 10 between the rolls 7. Batches of molten glass are then placed upon the molds or slabs 40, this operation being performed in the ordinary and well known manner, for instance as gathering or pouring. After a prescribed batch of molten glass has been placed upon each mold or slab, the stands or platforms 28 are tilted to discharge the glass into the pass 10, upon the sides of the wire gauze 26. With the rolls 7 revolving the glass deposited in the pass 10 is caused to cohere or weld together through the meshes of the gauze, thus completely incasing the wire gauze an equidistance from the outer sides of the glass. The size of the woven wire sheet or plate depends upon the size of the molds or slabs 40, and after the glass that has been deposited in the pass 10 has passed out of engagement with the rolls 7, the wire gauze or woven wire is cut at the upper edge of the finished product, allowing the finished product to slide on to the support 17, while the lower end of the wire gauze is raised and correctly positioned to be incased by other batches of molten glass. After a batch of molten glass is placed upon the mold or slab 40, it spreads to an even thickness throughout the surface of the mold or slab, and it is during this short interval that the molten glass congeals to form a plastic homogeneous sheet of a consistency propitious to rapid cohesion or welding, when two sheets are pressed together. Through the medium of the tilting stands or platforms the coagulation of the molten glass can be regulated to a nicety, since it is optional with the operator of the machine as to when the stands or platforms are to be tilted. It is therefore apparent that any imperfections in the molten glass can be discovered before the product is produced and the mold or slab containing the imperfect glass removed. This is equally true in connection with the woven wire gauze, as portions of the gauze containing irregularities can be readily removed before the gauze enters into the production of wire-glass.

An important characteristic of my invention resides in the easy control of the glass and gauze, thereby distinguishing from the well known United States and European methods. In eliminating casting tables and the mechanisms heretofore employed for correctly positioning the wire gauze the liability of distortion of the wire gauze and choking of the glass is obviated.

Having now described my invention what I claim as new, is:—

1. A machine of the type described, comprising revoluble rolls, means for suspending a movable piece of wire gauze between said rolls, and tiltable stands for feeding pliable sheets of glass between said rolls to sandwich the wire gauze.

2. A machine of the type described, comprising revoluble rolls, means for feeding a piece of wire gauze between said rolls, tiltable stands for feeding pliable sheets of glass between said rolls whereby the plates are caused to cohere together through the meshes of the wire gauze, and means for simultaneously tilting the stands.

3. A machine for making wire glass, comprising housings, adjustable revoluble rolls supported by said housings, a drum supported by said housings for feeding wire gauze between said rolls, and tiltable stands trunnioned between said housings for feeding pliable sheets of glass between said rolls.

4. A machine for making wire glass, comprising housings, adjustable revoluble rolls supported by said housings, a drum supported by said housings for feeding wire gauze between said rolls, tiltable stands trunnioned between said housings for feeding pliable sheets of glass between said rolls, and means arranged above said housings for tilting said stands.

5. A machine for making wire glass, comprising revoluble rolls, a drum arranged above said rolls and adapted to feed wire gauze between said rolls, and tiltable stands adapted to feed pliable sheets of glass between said rolls and cause the same to adhere to the wire gauze.

6. A machine for making wire glass, comprising revoluble rolls, tiltable stands, molds carried by said stands for feeding pliable sheets of glass between said rolls, and means for suspending wire gauze in the pass of said rolls to be incased by the pliable sheets of glass.

7. A machine for making wire glass comprising rolls, means for movably suspending a foraminous body between said rolls, a tiltable means for feeding pliable sheets of glass between said rolls whereby said sheets will be caused to cohere together through the openings of said body, and means for increasing the tilt as the sheets are fed to the rolls.

8. A machine for making wire glass comprising means adapted to movably support a foraminous body, tiltable stands for feeding pliable sheets of glass into engagement with said body, means for increasing the tilt as the sheets are fed to the rolls, and means for causing the pliable sheets of glass to cohere to each other through the openings in said body.

9. A machine for making wire glass comprising rolls having a pass therebetween, means arranged above said rolls for suspending the foraminous body in said pass, tiltable means adapted to feed pliable sheets of glass to said pass whereby said sheets are caused to cohere together through the meshes of said body, means for increasing the tilt as the sheets are fed to the rolls and a curved chute adapted to receive the wire glass from said pass.

10. A machine of the type described comprising compressing rolls, means for suspending a movable foraminous body between said rolls, tiltable means for feeding pliable sheets of glass between said rolls and sandwich the wire gauze between the sheets, means for increasing the tilt as the sheets are fed to the rolls and a curved chute for receiving the wire glass as it passes from the rolls.

11. A machine of the type described comprising compressing rolls with a pass therebetween, means for suspending a movable foraminous body in the pass of said rolls, supporting means for a plurality of pliable sheets of glass, means for tilting said supporting means whereby said sheets are fed simultaneously to said pass and caused to cohere together through the openings of said body, and means for increasing the tilt as the sheets are fed to the rolls.

12. A machine of the type described comprising compressed rolls with a pass therebetween, means for laterally adjusting said rolls with respect to the other whereby the width of the pass can be increased and decreased, means for suspending a movable foraminous body in said pass, tiltable means interposed between the rolls and said suspension means for simultaneously feeding pliable sheets of glass to said pass, whereby said sheets are caused to cohere through the openings in said body, means for increasing the tilt of said tiltable means as the sheets are fed to the rolls and means for receiving the wire glass as it leaves said pass.

In testimony whereof I affix my signature in the presence of two witnesses.

JOHN I. ARBOGAST.

Witnesses:
M. BAYAN,
MAX H. SROLOVITZ.